United States Patent Office 3,570,313
Patented Mar. 16, 1971

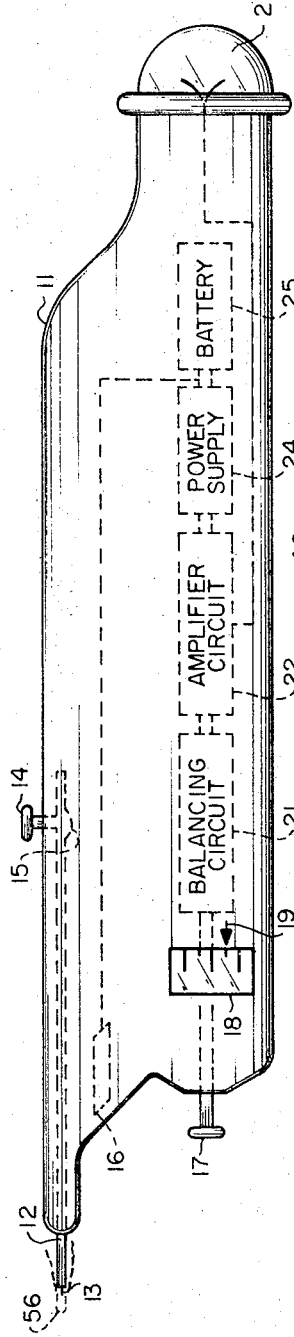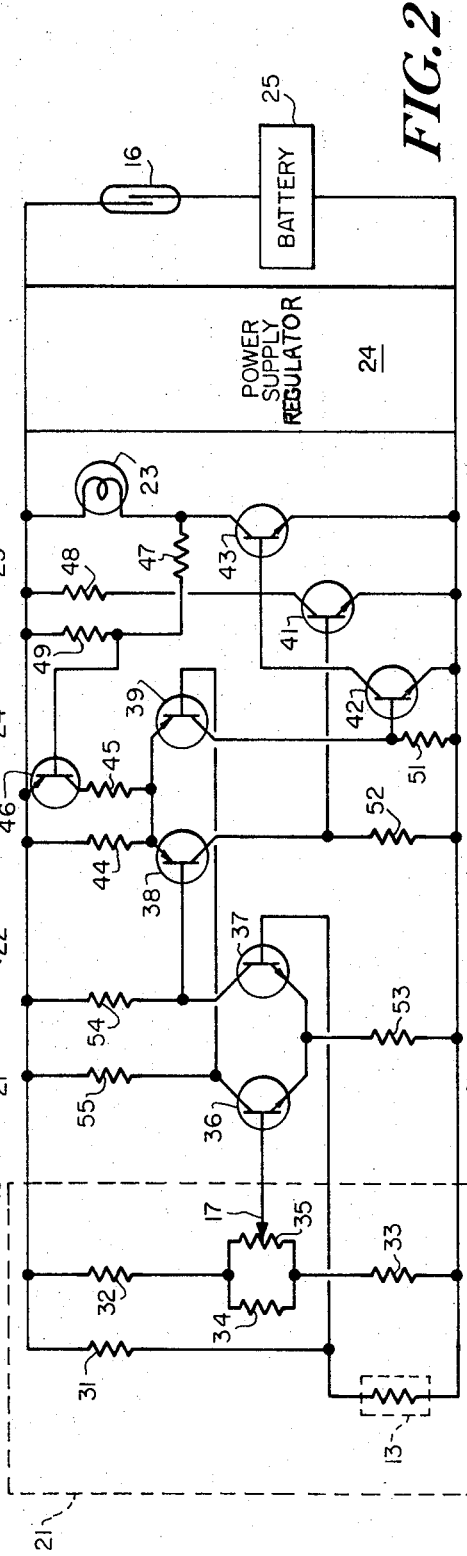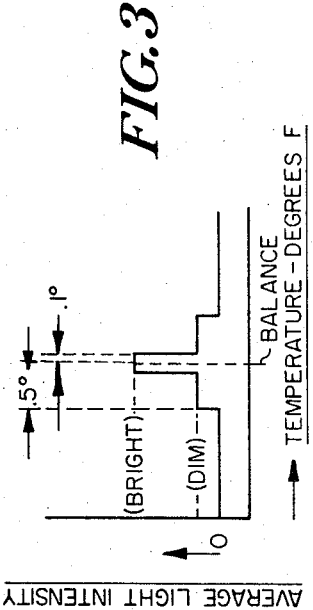

3,570,313
ELECTRIC RESISTANCE THERMOMETER
Ulrich Anton Frank, Yardley, Pa., and Carlton Stanley Tegge, Laurel Springs, N.J., assignors to Hoffmann-La Roche Inc., Nutley, N.J.
Filed Nov. 12, 1969, Ser. No. 875,608
Int. Cl. G01k 7/24
U.S. Cl. 73—362
7 Claims

ABSTRACT OF THE DISCLOSURE

An electrical resistance thermometer device having a resistance sensing unit forming part of a balancing circuit with a calibrated temperature readout dial, and a balancing detector having an amplifier circuit operable at different levels of sensitivity for driving a current passing through a lamp indicator at low and high current levels and thus providing dim and bright light intensity values, so that the lamp gives a dim indication when the balance detector nears balance and a bright indication when the balance detector is at balance. A probe carrying the sensing unit is mounted for reciprocating movement in and out from the device housing.

---

The present invention relates to a clinical thermometer of the electrical type and more particularly, an electrical resistance thermometer having a null-balance indicator and adjusting temperature readout capability.

In the field of electrical clinical thermometers, the feasibility of utilizing a thermistor thermometer is finding wide acceptance because of its relatively good sensitivity and fast response time. However, for the system as a whole to provide an accurate temperature measurement for example within one or two tenths of a degree Fahrenheit, the exact balance must be rather narrow zone. Most prior art devices attack this problem by utilizing a nullmeter which has proven to be costly and bulky.

It is the purpose of the present invention to solve this problem by providing a simple, inexpensive and small device. This is achieved by providing a thermistor thermometer device having a lamp which provides for a coarse indication of balance to locate the approximate balance point and then provides for a fine indication of balance to ascertain the exact balance point. In the present embodiment, the coarse and fine indications are obtained by varying the current supplied through the lamp to respectively effect dim and bright lamp values. Further features of the present invention include a reciprocating thermistor probe assembly where in extending the thermistor probe from a housing, electrical circuitry is activated, and in retracting the thermistor probe the electrical circuitry is deactivated. In addition, if a polyethylene sheath were to be used, this would be automatically discarded. All the operations manually called for in the present invention including holding the device itself, may be readily handled with a single hand.

Other objects, advantages, and capabilities of the present invention will become apparent from the following detailed description, taken in conjunction with the accompanying drawings illustrating a preferred embodiment of the invention.

In the drawings:

FIG. 1 shows a side elevation of the thermistor thermometer device with the electrical circuitry shown in block diagram.

FIG. 2 represents a detailed schematic circuit diagram mainly covering the amplifier circuit 22 and the balancing circuit or thermistor bridge 21.

FIG. 3 is a temperature versus average light intensity graph illustrating the effects of the various amplifier sensitivity stages, as regards lamp average intensity.

With reference to the drawings, there is shown in FIG. 1 housing 11 embodying a thermistor temperature indicating device. The device includes a thermistor probe 12 encased in a shrinkable tubing with a thermistor 13 seated at one end of and protruding out from the probe in a minute tit of a glass housing. As illustrated, thermistor probe 12 is adapted for reciprocating movement through an elongated cavity in housing 11, the movement being controlled by manipulation of thumb plate 14 secured to and protruding above a rearward portion of the thermistor probe. Thumb plate 14 contains a magnet 15 at its lower side which is adapted to co-operate with an on-off reed switch 16 by closing the switch when the thermistor probe is fully extended from the housing 11.

At the lower left hand side of the housing is an adjusting knob 17 which is connected for rotational movement with the variable center point of a potentiometer coil and dial 18, the latter being observable through a window within the housing. The potentiometer coil and dial 18 are each calibrated according to the graduated temperature indication so a temperature reading may be made at pointer 19. Connected with potentiometer coil is a thermistor bridge both combining to form a balancing circuit 21, which is connected to an amplifier circuit 22 that in turn is connected to a balance indicator or lamp 23. Also connected to amplifier circuit 22 is a power supply regulator 24 fed by a battery 25, the battery connection with the power supply regulator 24 being, however, interrupted by reed switch 16.

There is shown in FIG. 2, a detailed circuit diagram of the balancing circuit 21 and amplifier circuit 22 along with their interconnection with balancing indicator lamp 23, power supply 24, battery 25 and reed switch 16. Balancing circuit 21 includes potentiometer coil 35 connected intermediate resistors 32 and 33, and a resistor 34 having a value matched to the resistance of the thermistor 13, which, together with balancing resistor 31, is connected in parallel with coil 35. The value of balancing resistor 31 is to match that of the thermistor resistance at the electrical mid-point of the potentiometer coil. The variable cener tap of potentiometer coil 35 is secured to adjusting knob 17 as illustrated in FIG. 1.

The embodiment of amplifier 22, depicted in FIG. 2 has two differential stages of amplification. The first differential stage includes transistors 36 and 37, and the differential second stage includes transistors 38 and 39. Transistors 41 and 42 are coupled from the outputs of the second stage of amplification and to the base of transistor 43, which is connected with indicator lamp 23 and also the base of transistor 46 via resistor 47.

With a 3.6 volt output delivered by power supply 24 to the amplifier circuit, below would be typical values for the resistors in the circuit embodiment shown in FIG. 2:

| Resistors: | Resistance in K ohms |
| --- | --- |
| 31 and 33 | 4.76 each. |
| 54 and 55 | 10 each. |
| 53 | 4.7. |
| 51 and 52 | 1.2 each. |
| 44 | .909. |
| 45 | 1.18. |
| 47 | 15. |
| 48 | 15. |
| 49 | 10. |

OPERATION

In operation, thermistor probe 12 is first projected outwardly from the housing by manipulating thumb plate 14. As magnet 15 moves over the reed switch and is maintained in that position with the probe in its fully extended position reed switch 16 is closed to provide current to electrical circuit units 21, 22 and 24.

Once thermistor 13 has been placed in contact with the patient for measuring his temperature, the thermistor will sense the body temperature and provide a corresponding resistance change. Then, adjusting knob 17 is rotated manually as the user seeks the null position on thermistor bridge or balancing circuit 21, where balance indication lamp 23 will light up. Then a temperature measurement is made by merely observing or reading the dial temperature indicator 18 at pointer 19.

In describing the operation of amplifier circuit 22, let it first be assumed that the mid-point of potentiometer coil 35 is indicative of the patient's temperature. In this case, in seeking the null point, as the potentiometer tap via knob 17 is moved upward on potentiometer coil 35, a more positive voltage is applied to the base of transistor 36 to increase its forward bias. In turn, the current flow through transistor 39 will increase and its effect on the base of transistor 42 will reverse bias transistor 43 to prevent current flow to balance indicator lamp 23, thus maintaining the lamp in an off condition. Should knob 17 be moved downward from the assumed balance position, current passed by each of the transistors 37 and 38 will be increased and transistor 41 will bias transistor 43 nonconducting again maintaining the lamp in an off condition. It is readily apparent, then, when the balance detector is not near the null position, transistor 43 prevents current from flowing through the indicator lamp. Also, the base of transistor 46 is biased to be non-conducting.

As adjusting knob 17 is turned to approach the null point or balance, the difference in the currents passed by transistors 38 and 39 becomes increasingly smaller and one of transistors 41 and 42 is conducting slightly and the other non-conducting. Transistor 43 begins to turn on and pass some lamp current. Transistor 46 is then forward biased bringing resistors 44 and 45 in parallel, thus decreasing the overall emitter resistance for the second amplification stage and increasing the current passed by the same stage. Accordingly, the amplifier's sensitivity is stepped up in approaching balance. At exact balance, equal currents are passed by transistors 38 and 39 completely turning "off" transistors 41 and 42 allowing transistor 43 to pass maximum current from the power supply through the lamp to provide full brightness. Thus, use of resistor 44 gives a coarse or low sensitivity to find the approximate balance or null point, and use of resistor 45 in parallel with resistor 44 provides a fine or high sensitivity at balance.

As may be observed from the average light intensity versus temperature curve depicted in FIG. 3, in the present embodiment, the selected value of resistor 44 provides a sensitivity in a range of plus and minus five tenths of a degree Fahrenheit. Resistors 44 and 45 in parallel, provide a higher sensitivity within a range of plus and minus one-tenth of a degree Fahrenheit. Once the patient's temperature has been taken, as thermistor probe 12 is retracted by use of thumb plate 14, reed switch 16 opens to disconnect the battery.

If desired, a polyethylene sheath 56 could be optionally used to provide a disposable cover for the thermistor probe to avoid the need for sterilizing the probe after each use. The sheath might be tapered toward the tip to be tight-fitting as an air layer would cause a delay in reading. Retraction of the thermistor probe causes the polyethylene sheath to be automatically detached.

It should be understood, of course, that the foregoing disclosure relates to only preferred embodiments of the invention and that numerous modifications or alterations may be made therein without departing from the spirit and the scope of the invention. For example, it is possible to achieve several steps in sensitivity by adding additional transistors and resistors and selecting different turn on points for each of the added transistors. In addition, two lamps might be utilized, one to indicate coarse balance and the other fine balance.

We claim:
1. An electrical resistance thermometer device comprising
   heat sensitive electrical resistance means adapted for patient contact,
   balancing circuit means including calibrated temperature readout dial means and said resistance means, and adapted to be balanced for measuring a patient's temperature,
   indicator means including a power source and a lamp for producing light to indicate a balanced condition at said balancing circuit means, and
   balance detector means connected with said balancing circuit means for detecting a coarse balance indication to provide a dim lamp light and a fine balance indication to provide a bright lamp light.

2. A device according to claim 1 where said balance detector means includes,
   controllable current limiting means connected in series with said lamp, and
   differential amplifier means having a variable input impedance means and adapted to control said current limting means.

3. A device according to claim 2 where,
   said variable input impedance means has a first impedance value to define said coarse balance indication and a second impedance value to define said fine balance indication.

4. A device according to claim 3 where said variable input impedance includes,
   a first resistor, and
   a second resistor connected in series with a transistor and both connected in parallel with said first resistor.

5. A device according to claim 3 where said differential amplifier means includes
   a pair of control transistors each included at a different output lead of the amplifier means and both connected to said current limiting means.

6. A device according to claim 2 where said balance detector means includes,
   second differential amplifier means connected across said balancing circuit and connected to said other differential amplifier means.

7. A device according to claim 1 including,
   a housing for containing and balancing circuit means, indicator means, and balance detector means,
   a probe having said electrical resistance means mounted thereon, and adapted for reciprocating movement within and out from an elongated cavity in said housing, and
   switch means in said housing for causing said power source to be activated when the probe is extended out from said housing.

References Cited
UNITED STATES PATENTS
3,494,196  2/1970  Moussette _____ 73—362

LOUIS R. PRINCE, Primary Examiner

F. SHOON, Assistant Examiner

U.S. Cl. X.R.
324—98; 340—233